United States Patent
Nykolak et al.

(10) Patent No.: US 6,348,684 B1
(45) Date of Patent: Feb. 19, 2002

(54) RECEIVING SYSTEM FOR FREE-SPACE OPTICAL COMMUNICATIONS

(75) Inventors: Gerald Nykolak, Nassau, NY (US); Herman Melvin Presby, Middlesex; Paul F. Szajowski, Morris, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/276,168

(22) Filed: Mar. 25, 1999

(51) Int. Cl.[7] ................................................ H04B 10/06

(52) U.S. Cl. ...................................... 250/216; 359/193

(58) Field of Search ......................... 250/216; 359/742, 359/152, 172, 173, 189, 193, 195; 385/43

(56) References Cited

U.S. PATENT DOCUMENTS

| | | | | |
|---|---|---|---|---|
| 3,901,581 A | * | 8/1975 | Thiel | 385/43 |
| 4,799,778 A | | 1/1989 | Jebens | |
| 5,118,361 A | * | 6/1992 | Fraas et al. | 136/246 |
| 5,161,057 A | | 11/1992 | Johnson | |
| RE35,534 E | | 6/1997 | Claytor | |
| 5,647,041 A | | 7/1997 | Presby | |
| 6,051,776 A | * | 4/2000 | Kimata et al. | 136/246 |

* cited by examiner

Primary Examiner—F. L. Evans

(57) ABSTRACT

An optical receiving system includes a Fresnel lens optically coupled to a detector via a tapered concentrator. The Fresnel lens is adapted to receive an electromagnetic signal and has a Fresnel focal point. The tapered concentrator has a first end surface area larger than a second end surface area. The detector has a sensing surface area oriented to receive the electromagnetic signal emerging from the tapered concentrator.

23 Claims, 3 Drawing Sheets

RECEIVING SYSTEM FOR FREE-SPACE OPTICAL COMMUNICATIONS

FIELD OF THE INVENTION

The present invention relates to a receiving system for free-space optical communications.

BACKGROUND OF THE INVENTION

Receiving systems for free-space optical communications are arranged to receive an electromagnetic signal propagated through the atmosphere, rather than through a fiber-optic communications cable. Consequently, the electromagnetic signal at optical frequencies (e.g., infrared frequency range) is 10 subject to attenuation from atmospheric conditions, such as rain, snow, temperature inversion, or precipitation. The attenuation limits the maximum path length between an optical transmitter and an optical receiving system. In some cases, limitations in the maximum path length for optical communications systems may lead to the use of competitive technologies, such as short-haul microwave radios, instead of optical communication systems. Short-haul microwave radios may require governmental licensing, whereas optical communications system usually do not. Thus, a need exists for an optical receiving system that can compensate for attenuation from atmospheric conditions.

Free-space optical communications are subject to scintillation. Scintillation refers to an undesired variation in the received intensity of an electromagnetic signal propagating through a path of varying air density. Because air density is not entirely uniform over a cross-sectional area or volume of a propagating beam, the path through which the electromagnetic signal propagates may be modeled as a series of air pockets of varying density. The changes in density at the transitions between the air pockets may refract the electromagnetic signal causing attenuation or redirection of the electromagnetic signal. Scintillation can lead to unwanted fading of the electromagnetic signal and a reduction of the maximum reliable path length for an optical communications system.

Thus, a need exists for a receiving system that reduces or eliminates the deleterious effects of scintillation.

In conventional receiving systems, the cross-sectional area of the electromagnetic signal is on the order of one meter in diameter and the collection lens or mirror is merely five to ten centimeters in diameter because larger high quality lens are prohibitively expensive. While a large Fresnel lens is not prohibitively expensive, Fresnel lenses have not been used in commercially available optical receiving systems because a Fresnel lens alone does not generally provide an adequate focal spot for a detector, which has a response time sufficient for Megabit per second baud communications rates or greater. Thus, a need exists for facilitating the use of a commercially viable, larger lens in optical receiving systems.

SUMMARY OF THE INVENTION

In accordance with the invention, an optical receiving system comprises a Fresnel lens optically coupled to a detector via a tapered concentrator. The Fresnel lens is adapted to receive an electromagnetic signal and has a Fresnel focal point. The tapered concentrator has a first end surface area larger than a second end surface area. The detector has a sensing surface area oriented to receive the electromagnetic signal emerging from the tapered concentrator.

The combination of the Fresnel lens and the tapered concentrator cooperates such that. the tapered concentrator accepts the focal spot of the Fresnel lens and appropriately concentrates the focal spot onto the detector. The optical receiving system may reduce the effects of scintillation, attenuation, or both by collecting electromagnetic energy over majority of the cross-sectional area of the electromagnetic signal (e.g., conical beam) at the Fresnel lens.

One aspect of the invention includes a Fresnel lens with an aperture sufficient to reduce or eliminate the effect of scintillation upon the propagation of the electromagnetic signal incident upon the Fresnel lens. Another aspect of the invention includes a tapered concentrator that reduces a first focused radiation pattern produced by the Fresnel lens to a second focused radiation pattern having a localized area of intensity commensurate with a sensing surface area of a detector.

DETAILED DESCRIPTION OF THE PREFERRED EMBODIMENTS

Figure 1:
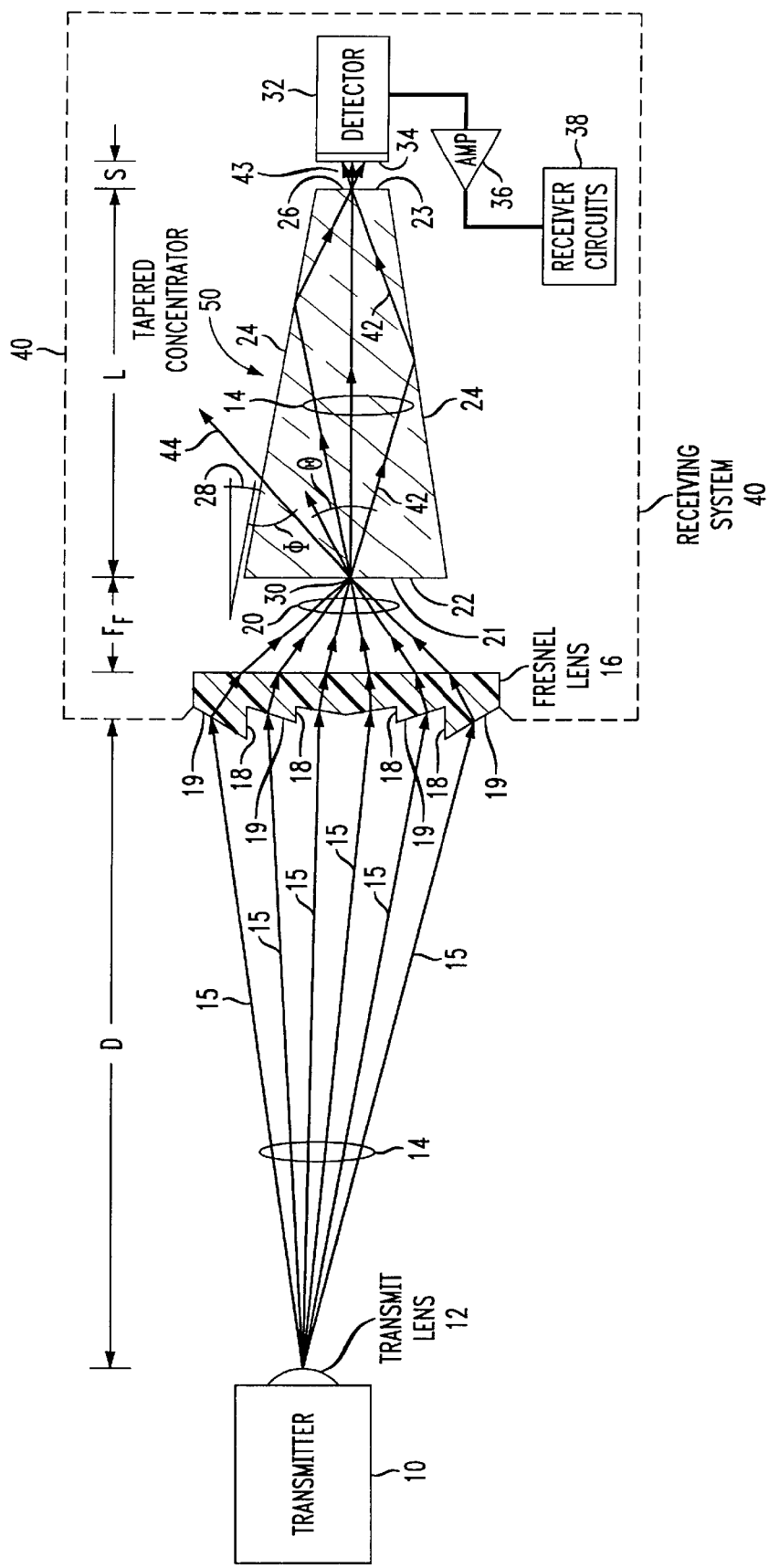
FIG. 1 shows a receiving system having a Fresnel lens and tapered concentrator in accordance with the invention.

In FIG. 1, an optical transmitter 10 transmits an electromagnetic signal 14, via a transmit lens 12, toward a Fresnel lens 16 of the receiving system 40. The transmit lens 12 of FIG. 1 produces a generally conical radiation pattern, although other radiation patterns are possible. The conical radiation pattern includes a plurality of representative rays 15 which define a potential propagational path (e.g., free-space path) between the transmitter 10 and the receiving system 40. The Fresnel lens 16 is oriented to intercept the electromagnetic signal 14 transmitted by the transmitter 10.

In accordance with the invention, an optical receiving system 40 comprises a Fresnel lens 16 optically coupled to a detector 32 via a tapered concentrator 50. The Fresnel lens 16 is adapted to receive an electromagnetic signal 14 and has a Fresnel focal point 30. The tapered concentrator 50 has a first end surface area 22 larger than a second end surface area 26. The detector 32 has a sensing surface area 34 oriented to receive the electromagnetic signal 14 emerging from the tapered concentrator 50. The detector 32 may be coupled to a receiver circuit 38 for subsequent signal processing via an amplifier 36.

A Fresnel lens 16 is generally a thin lens constructed with stepped setbacks so that the Fresnel lens 16 has the optical properties characteristic of a much thicker lens. FIG. 1 shows a cross-section of Fresnel lens 16. The cross-section of the Fresnel lens 16 includes a group of concentric rings 19 separated by steps 18. The concentric rings 19 may be generally circular, oval, or elliptical.

In general, the Fresnel lens 16 has an aperture sufficient to intercept an adequate surface area of the received electromagnetic field of the electromagnetic signal 14 to reduce or eliminate the scintillation of the received electromagnetic field. For example, the Fresnel lens 16 may have an aperture sufficiently large to intercept at least a majority of a receivable surface area associated with a received electromagnetic field of the electromagnetic signal 14. An aperture refers to the surface area of the Fresnel lens 16 which is available to collect or focus the electromagnetic signal 14. The receivable surface area represents a planar cross-section of a received signal beam of the electromagnetic signal 14 that is generally normal to or incident upon the Fresnel lens 16 at a receiving location.

The Fresnel lens 16 preferably has an aperture surface area sufficiently large to intercept as much of the received surface area of the electromagnetic signal 14 as possible to minimize or eliminate the effect of scintillation. The Fresnel lens 16 may have an aperture surface area based upon a transmit power of the electromagnetic signal 14, a receiver sensitivity of the receiving system 40, a gain associated with the transmit lens 12, a target minimum level of reliability, and a maximum path length of an unobstructed propagational path, among other factors. The target reliability may be defined in terms of bit-error-rate, frame-error rate, signal-to-noise ratio, signal-to-interference ratio, availability as a percentage of time, errored seconds, severely errored seconds, or another comparable measure of reliability.

Ideally, if the transmitter 10 were to transmit a conical beam, the Fresnel lens 16 would have an aperture commensurate with or substantially equal to a cross-sectional area of the conical beam at the receiving system 40 such that scintillation of the transmitted electromagnetic field would be eliminated entirely. However, the actual path length (D) between the transmitter 10 and the receiving system 40 will often depend upon a particular application so that complete obliteration of the scintillation is not always practical. Further, spatial limitations, aesthetic appearance, and mechanical stability of the Fresnel lens 16 based on commercial considerations, among other factors, may limit the aperture of the Fresnel lens 16 to less than the ideal aperture size, which corresponds to the cross-sectional area of the conical beam as received at the location of the receiving system 40.

Advantageously, the Fresnel lens 16 may be readily manufactured from a transparent plastic or a transparent polymer material to provide an economical lens with a significantly larger aperture area than a glass lens of comparable manufacturing cost. In practice, the Fresnel lens 16 of polymeric construction can attain a gain factor of at least three decibels over a baseline lens of glass construction having an equivalent cost to the Fresnel lens 16. The Fresnel lens 16 may be composed of a polymer material such as a polycarbonate, a silicone-based polymer, or an acrylate. If the Fresnel lens 16 is composed of a transparent plastic or a transparent polymer, the Fresnel lens 16 is somewhat diffusive in comparison to a glass lens. The tapered concentrator 50 may ameliorate the diffusive characteristics of the Fresnel lens 16 by achieving a suitable region of overlap between the electromagnetic signal 14 exiting the tapered concentrator 50 and the sensing surface 34.

The Fresnel lens 16 has a Fresnel focal point 30 at which the received electromagnetic radiation is focused into a first focused radiation pattern. A tapered concentrator 50 is capable of reducing a first focused radiation pattern to a second focused radiation pattern having a localized area of intensity commensurate with a sensing surface area 34 of a detector 32.

The tapered concentrator 50 has first end surface area 22 that is located coincident with a Fresnel focal point 30 or at another suitable distance from the Fresnel lens 16 to accept electromagnetic radiation from the Fresnel lens 16. The tapered concentrator 50 is gradually tapered to form a smooth transition for the electromagnetic field propagating therein. The tapered concentrator 50 preferably has at least a generally conical mid-section. The tapered concentrator 50 preferably has a generally conical surface 24 located between the first end 21 and the second end 23.

The electromagnetic field may propagate within the tapered concentrator 50 under conditions of reflection or total internal refraction as illustrated by guided ray 42. The tapered concentrator 50 may promote electromagnetic propagation of the electromagnetic field from a first end 21 to a second end 23 by having an index of refraction exceeding that of the volume (e.g., air or a vacuum) surrounding the tapered concentrator 50 by at least five percent. In practice, if the tapered concentrator 50 is made of glass and the surrounding volume is air, the index of refraction of the tapered concentrator 50 may exceed the index of refraction of the surrounding volume within a range from forty percent to sixty percent. For example, a tapered concentrator 50 made of fused silica glass may have an index of refraction of approximately 1.5 in comparison to air, which has an index of refraction of approximately 1. If the receiving system 40 is configured to work at the infrared frequency range, the tapered concentrator 50 is preferably constructed of fused silica glass.

The tapered concentrator 50 has a numerical aperture associated with the first end 21. The numerical aperture describes the light gathering capability at the first end 21 of the tapered concentrator 50. The choice of numerical aperture represents a compromise between coupling efficiency and distortion. If the numerical aperture is too small, insufficient coupling of electromagnetic energy from the Fresnel lens 16 may occur. If the numerical aperture is too large, the electromagnetic signal 14 may be distorted and greater propagational losses may occur in the tapered concentrator 50.

The numerical aperture (N.A.) is determined according to the following equation: $N.A.=n_1 \sin(\theta/2)$, wherein $n_1$, is the refractive index of the medium surrounding the tapered concentrator 50 and $\theta$ is an angle of radiation emanating from the Fresnel focal point 30 toward a first end 21 of the tapered concentrator 50. The maximum numerical aperture is one where the medium surrounding the tapered concentrator 50 is air. Although any possible value of numerical aperture may be adequate to practice the invention, a numerical aperture within a range of 0.1 to 0.5 may be used to avoid distortion of the electromagnetic signal 14 within the tapered concentrator 50.

The optical coupling between an interior of the tapered concentrator 50 and the Fresnel lens 16 may be adjusted by adjusting a distance between the first end 21 and the Fresnel lens 16 to achieve a desired balance between transmission and distortion of the electromagnetic signal 14. In general, the first end 21 is separated from the Fresnel lens 16 by a distance equal to or greater than the Fresnel focal point 30 to obtain suitable optical coupling into the interior of the tapered concentrator 50. In a preferred embodiment, the first end 21 coincides with the Fresnel focal point 30 so the interior of the tapered concentrator 50 receives the maximum amplitude of the electromagnetic signal from the Fresnel lens 16.

The tapered concentrator 50 preferably has an axial length measured between the first end 21 and the second end 23. The axial length is selected to promote the propagation of the electromagnetic signal 14 from the first end 21 to the second end 23 via reflection or total internal reflection resulting from refraction. The axial length is preferably long enough to produce a gradual transition between the first end 21 and the second end 23 without significant undesirable losses from refractions that may otherwise cause the electromagnetic energy to escape from the tapered concentrator 50 via the walls instead of the second end 23. Such refractive losses occur, for example, when the radiation strikes the walls at an angle of incidence greater than the critical angle φ or Brewster's angle, as illustrated by lost ray 44. In FIG. 1, the critical angle φ depends upon the index of refraction of the tapered concentrator 50 relative to the index of refraction of the medium (e.g., air) surrounding the tapered concentrator 50. Thus, with due consideration for the refractive index of the tapered concentrator 50, the slope of the walls of the tapered concentrator 50 are preferably selected with a taper angle 28 to minimize refractive losses between the transition from the first end 21 to the second end 23.

The tapered concentrator 50 has a minimum axial length between the first end surface area 22 and the second end surface area 26. The minimum axial length is preferably great enough so that the taper angle 28 lies at or below a maximum taper angle associated with maximum permissible refractive losses for the electromagnetic signal 14 propagating within the tapered concentrator 50. For a tapered concentrator 50 with an uniform index of refraction within a range from 1.2 to 1.6, the taper angle 28 is preferably fifteen degrees or less. A suitable minimum axial length may be determined after proper determination of the taper angle that yields a desired transmissibility from the first end 21 to the second end 23. For example, the minimum axial length may be greater than or equal to a diameter of the first surface area multiplied by five to attain a sufficiently gradual taper.

At the Fresnel focal point 30, a first radiation pattern 20 is concentrated in intensity at a first spot having a first radial diameter. In FIG. 1, the radial diameter is coincident with a plane projecting perpendicularly outward from a surface of the drawing. The tapered concentrator 50 reduces the first spot into a second spot having a second radial diameter smaller than the first radial diameter. The second radiation pattern is concentrated in intensity at a second spot having a planar surface area or cross section commensurate with the sensing surface area 34.

The tapered concentrator 50 mitigates at least some deficiencies in the focal quality of the Fresnel lens 16. In doing so, the tapered concentrator 50 concentrates the received electromagnetic radiation from the Fresnel lens 16 on a sensing surface area 34 of the detector 32. The concentration factor of the light may be calculated in accordance with the following equation: $R=NA/n_2$, wherein N.A. is the numerical aperture and $n_2$ is the index of refraction of the tapered concentrator 50. Thus, if the Fresnel lens 16 presents the tapered concentrator 50 with a numerical aperture of 0.4 and if the index of refraction of the tapered concentrator 50 is 1.5, the concentration factor is 0.26 representing a 26% reduction of in the radial diameter from the first spot to the second spot.

Although the detector 32 may generally comprise any photosensitive device providing an output voltage or output current in response to any range of electromagnetic radiation, the detector 32 generally comprises a photosensitive device with a sufficiently rapid response time to yield at least megabit baud transmission rates. The detector 32 preferably comprises a photosensitive device with a sufficiently rapid response time to infrared light to yield at least gigabit baud transmission rates(Gbits/sec). Accordingly, the sensing surface area 34 of the detector 32 is typically limited with a range from 75 square microns to 1200 square microns, although the sensing surface area 34 may be different from the foregoing range and still fall within the scope of the invention.

The sensing surface area 34 is spaced from the second end surface area 26 of the tapered concentrator 50 by a gap 43 consistent with the tendency of the electromagnetic radiation emerging from the second end 23 to diverge. In practice, the gap 43 has a gap distance (S) that may be less than 10 microns to maximize incidence of the electromagnetic signal 14 on the sensing surface. A transparent adhesive preferably seals the gap 43 to reduce reception errors or failures caused by condensation on the sensing surface, contamination with foreign substances, or any other body that might otherwise interfere with the propagation of the electromagnetic signal 14 between the second end 23 and the sensing surface area 34.

The output of the detector 32 changes in response to modulation of the received electromagnetic signal 14 or any other detectable variation in the received electromagnetic signal 14. The change in detector 32 output may be realized as a change in output current, output voltage, resistance, or another electrical parameter. An amplifier 36 preferably amplifies a detector output of the detector 32 prior to providing the detector output to receiver circuits 38, such as a demodulator.

In a typical application, the optical receiving system 40 may be configured to operate at approximately 0.8 micron range wavelength, 1.3 micron wavelength range, or 1.5 micron wavelength range, although any other optical frequency range may be used to practice the invention. The receiving system 40 can improve the receiving signal strength and reduce fading of the optical communications signal or increase the path length (D) through the combination of a Fresnel lens 16 with a sufficiently large aperture surface area to capture a majority of the receivable surface area of the received electromagnetic signal 14. Although other dimensions are suitable for practicing the receiving system 40 of the invention, in an illustrative example the Fresnel lens 16 has a diameter of at least one meter, the first end surface has a first radius of at least 0.15 meters and the second end surface has a second radius of at least 10 microns.

Figure 2:
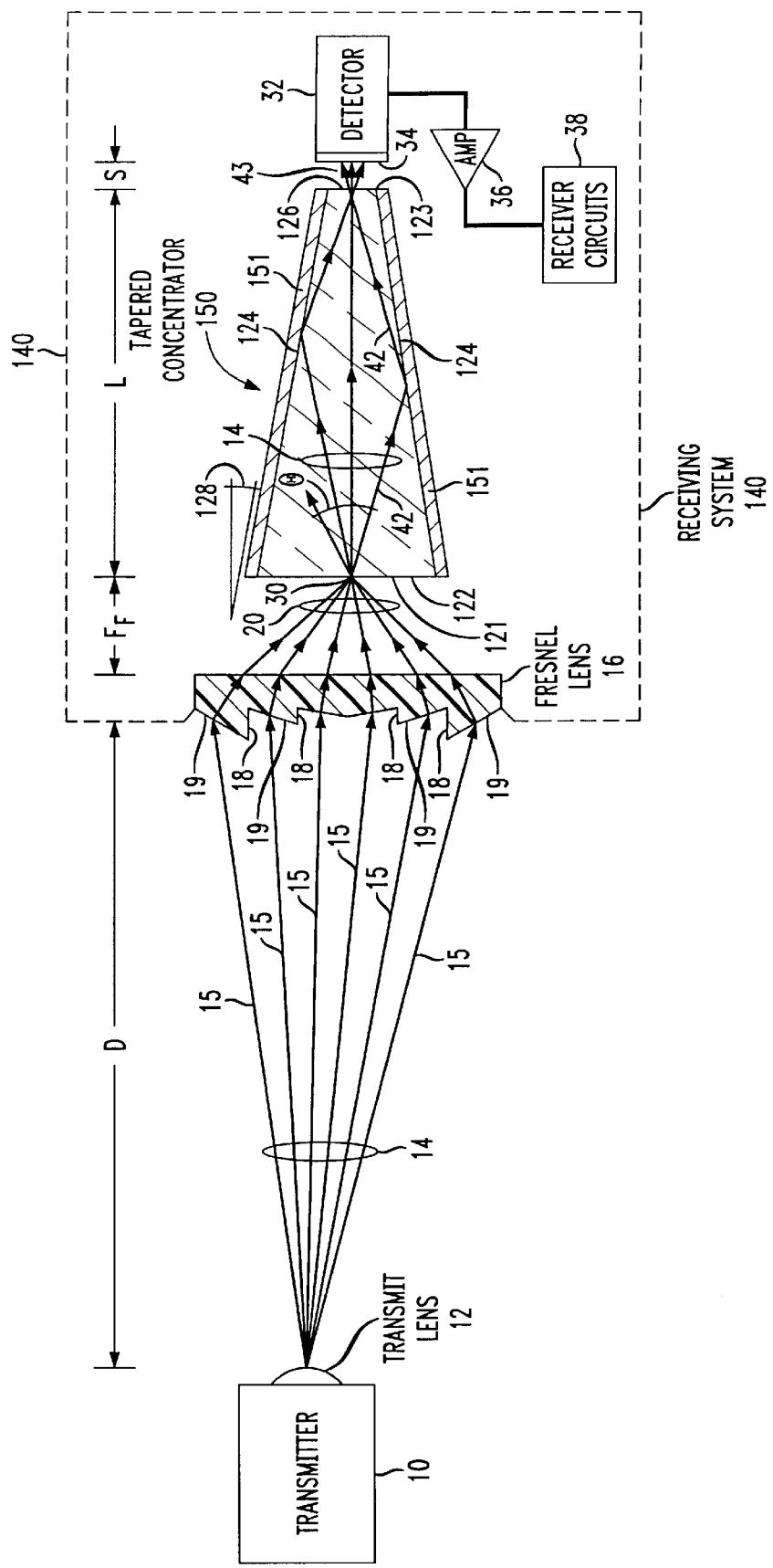
FIG. 2 shows an alternate embodiment of a receiving system in accordance with the invention.

FIG. 2 illustrates an alternative embodiment of the receiving system 140 which is similar to the embodiment of FIG. 1 except for the tapered concentrator 150. Accordingly, like numbers in FIG. 1 and FIG. 2 indicate equivalent elements.

The tapered concentrator 150 may promote propagation from the first end 121 to the second end 123 by treating a generally conical surface 124 of the tapered concentrator 150 with a metallic coating 151. The metallic coating 151 may be formed by metallization, electroless plating, sputtering, application of an adhesive containing reflective metallic particles (e.g., silver particles), or any other suitable method.

The first end surface area 122 exceeds the second end surface area 126, similar to that previously described in conjunction with FIG. 1. While the foregoing refractive losses may be eliminated by treating the conical surface 124 of the tapered concentrator 150 with a metallic coating, as previously described, the tapered concentrator 150 still must be gradually tapered with a slope or a taper angle 128 sufficient to avoid undesired reflections toward the Fresnel lens 16 and to produce an acceptable standing wave ratio of transmitted versus reflected power through the tapered concentrator 150.

Figure 3:
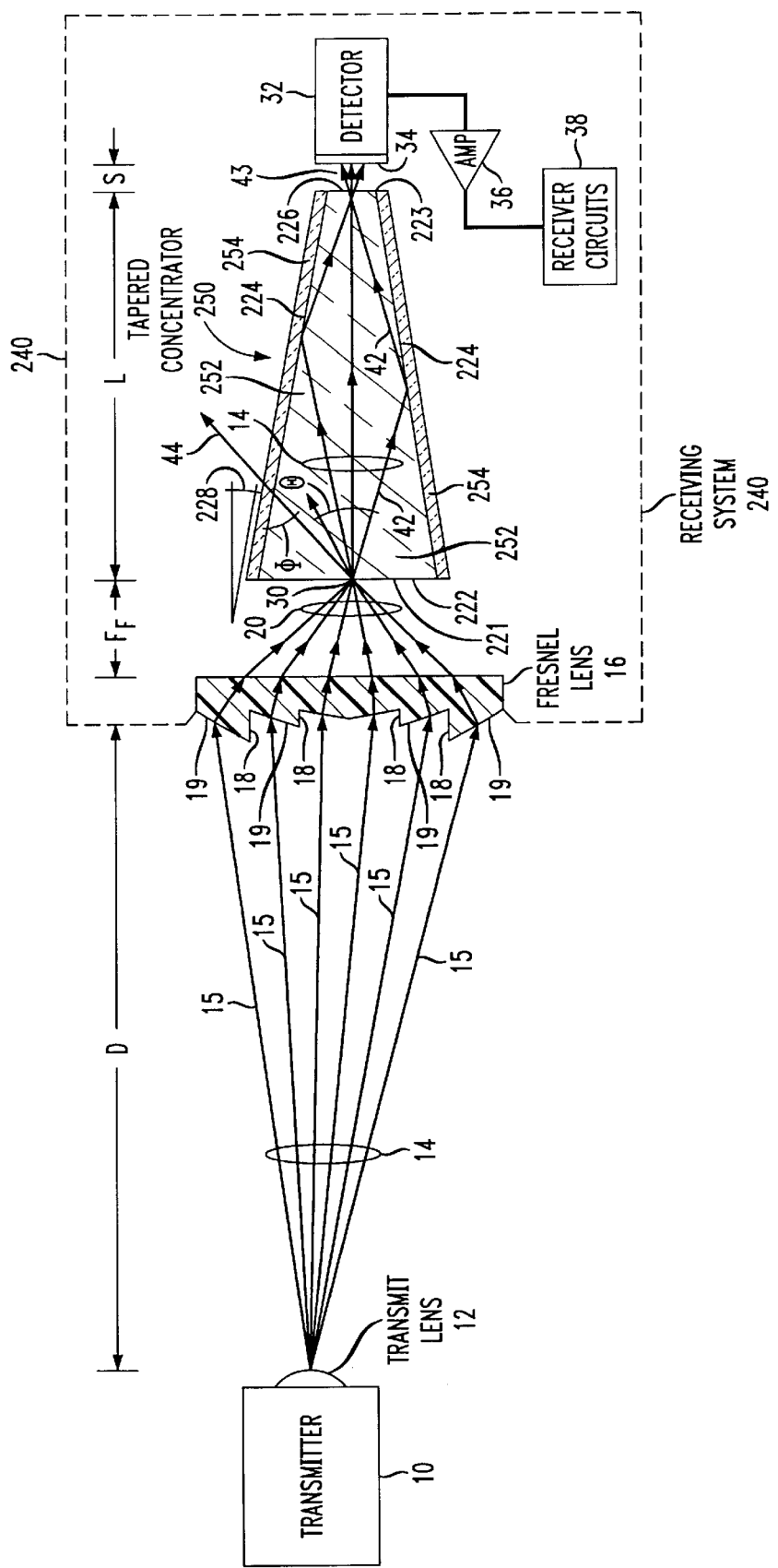
FIG. 3 shows another alternate embodiment of a receiving system in accordance with the invention.

FIG. 3 shows another alternate embodiment of a receiving system 240 which is similar to FIG. 1 except for the tapered concentrator 250. Like reference numerals in FIG. 1 and FIG. 3 indicate equivalent elements.

The tapered concentrator 250 has a first end surface area 222 exceeding a second end surface area 226 in a manner similar to that previously described in conjunction with FIG. 1. The tapered concentrator 250 may have a variable refractive index or a stepped refractive index to promote total internal refraction of electromagnetic radiation entering the first end 221 and propagating toward the second end 223. A stepped refractive index has an abrupt transition between different refractive indices, whereas a tapered refractive index has a gradual transition between different refractive indices. A gradual transition between different refractive indices may provide a more wide-band frequency response, than an abrupt transition does, to efficiently pass electromagnetic radiation through the tapered concentrator 250 within a greater frequency range.

The refractive index advantageously has a radial variation within the tapered concentrator 250 such that an inner core 252 of the concentrator has a greater refractive index than an outer layer 254 of the concentrator. The inner core 252 has a first index of refraction while the outer layer 254 has a second index of refraction. An interface between the first index of refraction and the second index of refraction may be stepped, or it may be a gradual transition in which the density of the tapered concentrator 250 changes without a discrete boundary between the first index of refraction and the second index of refraction. The inner core 252 and the outer layer 254 may define conical shapes in which the inner core 252 is nested inside or surrounded by the outer layer 254. The conical shapes preferably have a taper angle 228 or slope consistent with the principles of the taper angle previously described in conjunction with FIG. 1.

This specification describes various illustrative embodiments of the system of the present invention. The scope of the claims is intended to cover various modifications and equivalent arrangements of the illustrative embodiments disclosed in the specification. Therefore, the following claims should be accorded the reasonably broadest interpretation to cover the modifications, equivalent structures, and features which are consistent with the spirit and the scope of the invention disclosed herein.

The following is claimed:

1. An optical receiving system for free-space optical communications, comprising:
    a Fresnel lens for receiving an optical communication signal carrying information;
    a tapered concentrator having a first end surface area larger than a second end surface area and being in optical communication with the Fresnel lens; and
    a detector having a sensing surface area oriented to receive the communication signal emerging from the tapered concentrator and convert the information in the communication signal into an electrical signal.

2. The system according to claim 1 wherein the tapered concentrator has a generally conical mid-section.

3. The system according to claim 1 wherein the Fresnel lens has a Fresnel focal point and wherein the first end surface area is coincident with the Fresnel focal point.

4. The system according to claim 1 wherein a gap of less than 10 microns lies between the tapered concentrator and the sensing surface area of the detector.

5. The system according to claim 4 wherein the gap is filled with a transparent adhesive.

6. The system according to claim 1 wherein the Fresnel lens has an aperture surface area sufficiently large to intercept at least a majority of a receivable surface area associated with a field of the communication signal.

7. The system according to claim 1 wherein the tapered concentrator is tapered at a taper angle determined at least in part by a minimum axial length between the first end surface area and the second end surface area, said length being such that the taper angle lies at or below a maximum taper angle associated with maximum permissible refractive losses for the communication signal propagating within the tapered concentrator.

8. The system according to claim 7 wherein the taper angle is less than fifteen degrees.

9. The system according to claim 1 wherein the Fresnel lens comprises a material selected from the group consisting of a transparent plastic and a transparent polymer.

10. The system according to claim 1 wherein the tapered concentrator comprises silica glass.

11. The system according to claim 1 wherein the second end surface area of the tapered concentrator is commensurate in size with a sensing surface area of the detector.

12. The system according to claim 1 wherein the tapered concentrator has a generally conical surface and a metallic coating overlying the generally conical surface.

13. The system according to claim 1, further comprising:
    a receiver receiving and processing the electrical signal.

14. An optical receiving system for free space optical communications, comprising:
    a Fresnel lens for receiving an optical communication signal carrying information, the Fresnel lens having a Fresnel image focal point;
    a tapered concentrator having a first end surface area larger than a second end surface area, the Fresnel image focal point coinciding with the first end surface area to communicate the communication signal from the Fresnel lens to the tapered concentrator;
    a detector having a sensing surface area oriented to receive the communication signal emerging from the tapered concentrator and convert the information in the communication signal into an electrical signal.

15. The system according to claim 14 wherein the tapered concentrator has an inner core having a first index of refraction and an outer layer having a second index of refraction lower than the first index of refraction.

16. The system according to claim 15 wherein the inner core and the outer layer are generally conical and wherein the inner core is nested inside the outer layer.

17. The system according to claim 15 including an interface between the inner core and the outer layer, and a transition between the first index of refraction and the second index of refraction at the interface.

18. The system according to claim 15 wherein the first index of refraction and the second index of refraction are graded to yield a gradual or nonstepped transition between the first index of refraction and the second index of refraction.

19. The system according to claim 14 wherein the tapered concentrator has a generally conical surface and a metallic coating overlying the generally conical surface.

20. The system according to claim 14 wherein the Fresnel lens has an aperture surface area sufficiently large to intercept at least a majority of a receivable surface area associated with a field of the communication signal.

21. The system according to claim 14 wherein the tapered concentrator is tapered at a taper angle determined at least in part by a minimum axial length between the first end surface area and the second end surface area, said length being such that the taper angle lies at or below a maximum taper angle associated with maximum permissible refractive losses for the communication signal propagating within the tapered concentrator.

22. The system according to claim 21 wherein the taper angle is less than fifteen degrees.

23. The system according to claim 14 further comprising:
    a receiver receiving and processing the electrical signal.

* * * * *